May 22, 1962

J. F. GRIMLAND ET AL 3,036,198

ELECTRIC WELDING SYSTEM

Filed Feb. 12, 1959

Joseph F. Grimland
Charles J. Grimland
INVENTORS

BY *Clarence A. O'Brien*
*and Harvey B. Jacobson*
Attorneys

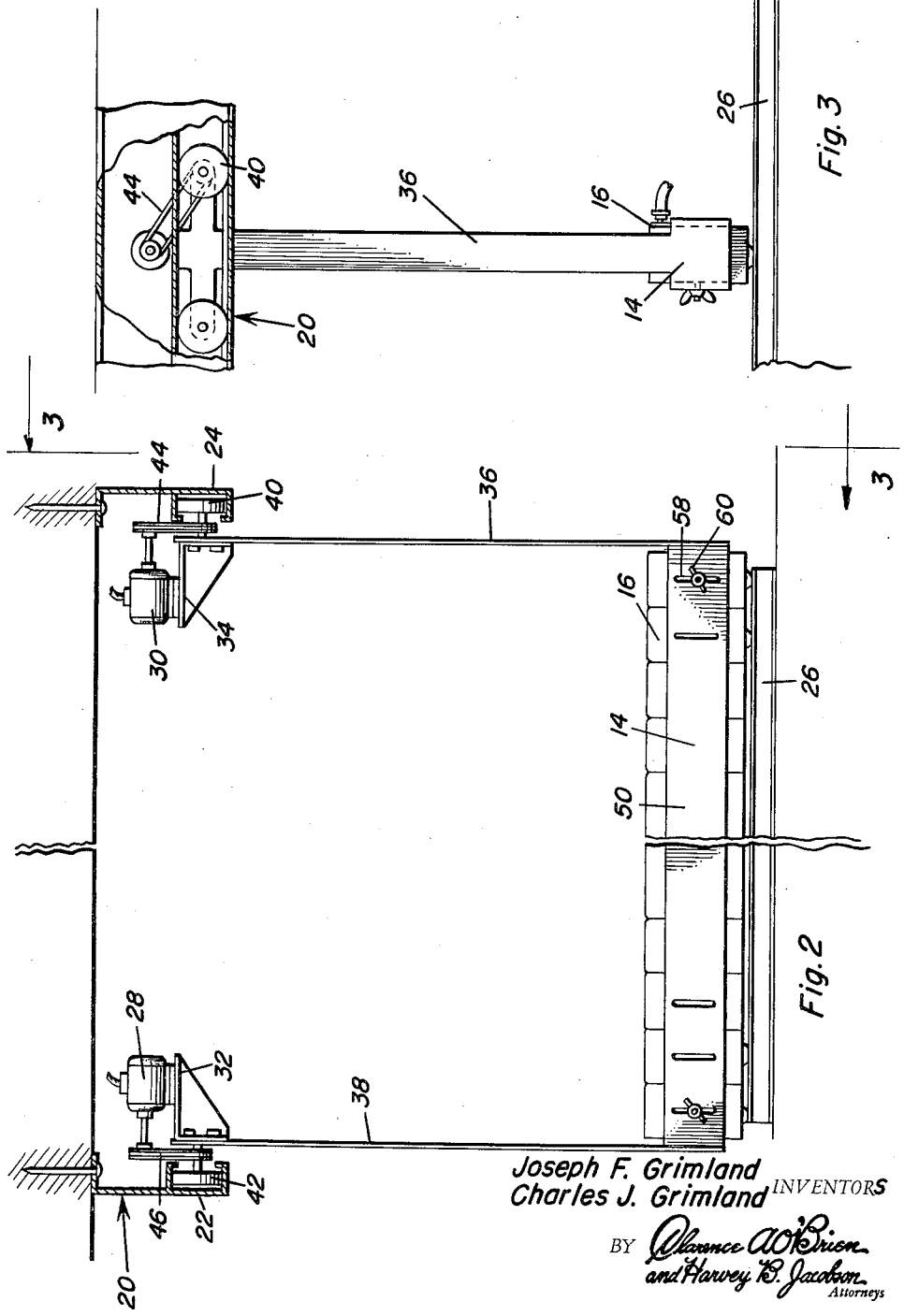

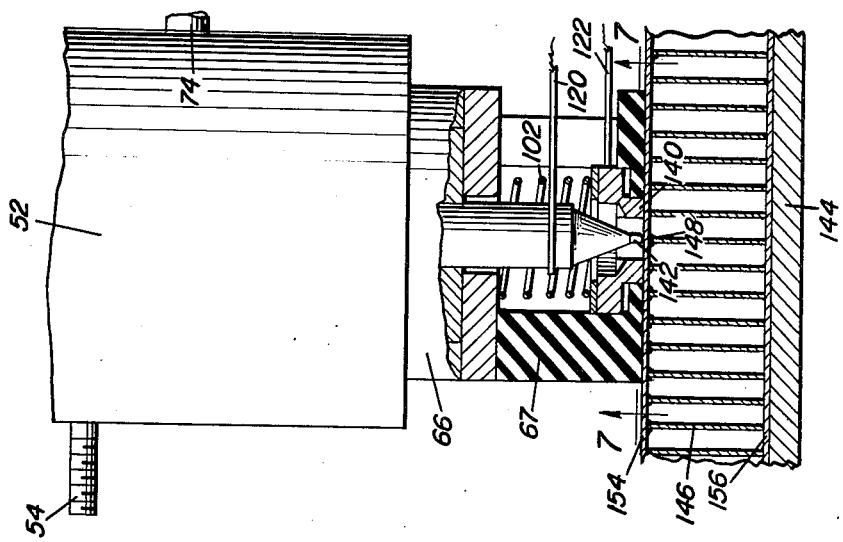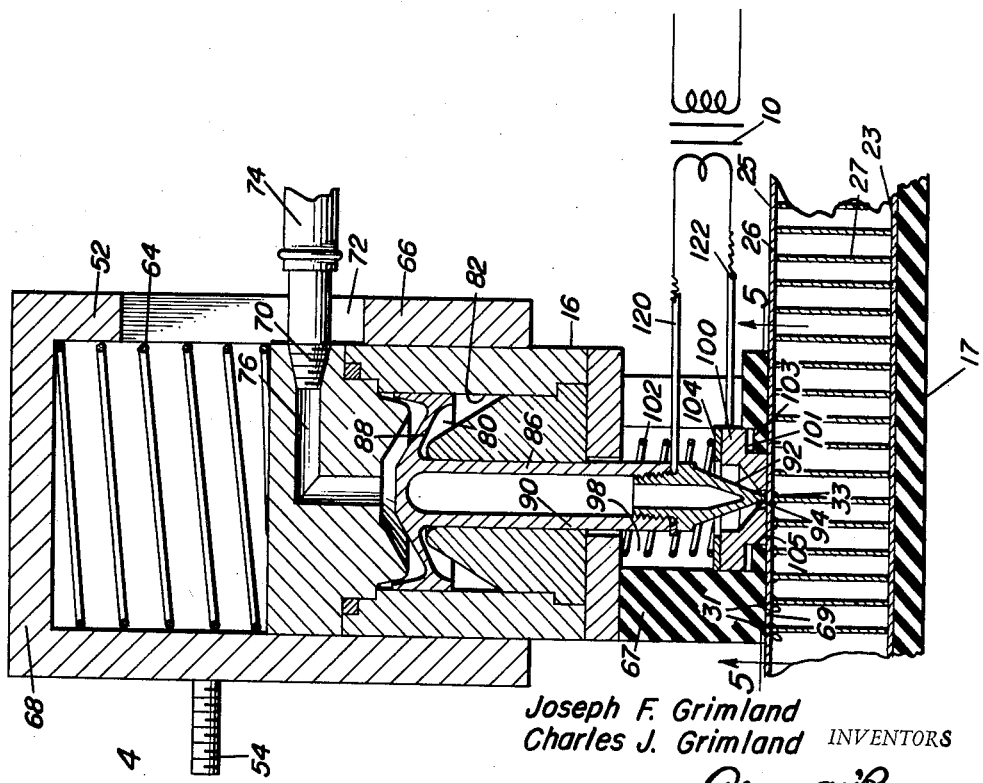

May 22, 1962   J. F. GRIMLAND ET AL   3,036,198
ELECTRIC WELDING SYSTEM
Filed Feb. 12, 1959   4 Sheets-Sheet 4

Joseph F. Grimland
Charles J. Grimland
INVENTORS

BY Clarence A. O'Brien
and Harvey B. Jacobson
Attorneys

United States Patent Office 3,036,198
Patented May 22, 1962

3,036,198
ELECTRIC WELDING SYSTEM
Joseph F. Grimland and Charles J. Grimland, Marietta, Ga.; said Charles J. Grimland assignor to said Joseph F. Grimland
Filed Feb. 12, 1959, Ser. No. 792,766
10 Claims. (Cl. 219—78)

This invention relates to electric welding and more particularly to new and useful improvements in electric welding apparatus and techniques.

At the present time there is a need for very strong honeycomb structure. Such structure is composed of a honeycomb together with face sheets which are brazed on the surfaces of the honeycomb. The honeycomb plus face sheets form a sandwich organization, a current demand being for stainless steel material from which the honeycomb and face sheets are constructed. It is evident that the honeycomb structure may be made of different thicknesses, shapes, contours, and the materials of construction may be varied both as to thickness and substance. However, one typical honeycomb structure may be made of one sheet of AMS–350 stainless steel, this sheet being about .010 inch thick; one honeycomb made from .0015 inch thick AMS–350 sheet formed into an irregular shape and then seam welded to form approximately ⅜₆ of an inch semi-squares with the height of these squares being 1 inch after machining and grinding. The final part of the honeycomb structure is another sheet of AMS–stainless steel which is .010 inch thick, making a typical sandwich organization of honeycomb structure with an over-all height of approximately 1.020 inches thick. Such a honeycomb structure is ordinarily made by brazing, using controlled processes and controlled atmospheric conditions. The cost of fabrications of structures of this type may reasonably be considered absurd.

An object of this invention is to provide welding equipment and a technique or at least, improvements in existing welding equipment enabling new welding procedures to be accomplished that will very materially reduce these costs and effect a better structure than that achieved by brazing. With reference to the currently used technique, attention is invited to Product Engineering Publication of December 8, 1958, published by McGraw-Hill Publishing Company of New York city.

Although the technique and portions of the welding equipment described herein are ideally suited for constructing sandwich structure as aforesaid, and the invention has achieved a very material reduction in cost in the production of such sandwich structure with the fortunate result of a better honeycomb structure product, it is to be understood that other types of materials, apart from stainless steel, and certainly other dimensions of materials of various types may profit by the technique and apparatus described herein.

A further object of the invention is to provide welding apparatus and disclose welding techniques for making successful weld joints on all of the necessary areas of the sandwich-type structure, involving highly refined types of electric welding, requiring the addition of no filler material other than that received from the parent metals in the honeycomb structure.

A further object of the invention is to provide welding apparatus improvements in the stored energy type of welder, the improvements centering largely about one but preferably a bank of welding heads that may be caused to operate on either A.C. or D.C. A typical head has a pair of electrodes that are spaced from each other and placed on one surface of the components of a honeycomb structure. One of the pair of electrodes is held in contact with the sheet by a small force. The motion of this electrode is in a direction at which the electrode moves against and away from one sheet of the honeycomb structure. The other electrode of the pair is maintained by very light spring pressure against the same surface of the sheet, and the welder furnishes the electrodes with the necessary power, either A.C. or D.C. to cause current to flow from one electrode, through the sheet and to the other electrode. The very light electrode follows up the weld and forges the welds practically instantaneously and this is in part responsible for the high quality welds which are obtained at the confronting edges of the honeycomb and sheet.

In practice of the invention an electric current having a definite wave form for the particular materials being welded flows between the two electrodes, but the two electrodes are located on the top surface of the material that is being welded with the weld being formed on the bottom surface. Current flows from one electrode to the other in a curved path, and this curvature may be varied by the amount of power used. Considering an example of D.C. current and the particular example honeycomb structure specified previously, highly satisfactory results are obtained by using the discharge from a single 120 microfarad capacitor and approximately 1400 volts discharged through a transformer having a turns ratio of approximately 376 to 1. The firing sequence takes place in a few milliseconds. The tip of one electrode in this case might be only $\frac{3}{32}$ of an inch in diameter. If the other electrode is circular and surrounding the $\frac{3}{32}$ inch electrode, a halo having an inside diameter of approximately $\frac{3}{16}$ of an inch exists in the vicinity of the electrodes and sheet on which the electrodes are operative. Variations in the above ratios and sizes enable the halo to reach larger or smaller sizes with a corresponding change in welding area and welding speeds.

Results show that a natural fillet is formed during welding, between the contacting areas of the honeycomb and sheet on the side of the sheet opposite to that occupied by the electrodes. The confronting areas of honeycomb structure and sheet first puddle and then join. The weld puddle is formed under the sheet and between the gaps of the semi-squares on the thin material which results in welding that is considered to produce the best possible structural condition.

To effect a suitable weld the following conditions fulfilled by the invention, are required.

(1) The electric flowing through the skin mat and the mat in the under surface must be balanced as to heat. In this case of the honeycomb welding where the edge is very thin and the materials to be welded are at right angles, the majority of the heat is placed on the top layer or skin. This metal becomes molten and under proper conditions will form a dimple away from the electrode, due to upsetting of small heated areas in a sheet. This dimple is in a fluid state and at a high temperature which flows around the edge of the honeycomb forming a fillet and fusing to the honeycomb mat. The electrode in turn tends to keep the top surface only of the material cooler and not in a completely liquid state.

(2) For this skin metal not to be effected as to heat treatment and grain structure the weld must be made very rapidly. Also since there is no atmosphere control the rapid welding prevents excessive oxidizing of the mating surfaces, that would prevent good fusion.

(3) The outer edges of the crater formed by the molten metal must be forged to prevent shrinkage cracks in the weld.

(4) Since this molten crater is fluid and is not surrounded by solid metals as in a spot weld, the metal of one point is not structurally supported by another part and welding tip pressures approach zero. Forge pressures are also low and should have a high velocity-weight ratio to only affect the surface material.

In order to meet the above conditions the following must be accomplished by the welding device.

(a) Produce a very short high intensity weld pulse of the proper electric wave form, for example, a wave form which rises rapidly and falls gradually.

(b) The moving parts of the weld head must have the proper force weight ratio to follow up the crater formation and forge the weld edges when the pressure exerted by the tip is at near zero.

(c) The weld head electrode tip must approach or have a zero frictional force component in order to respond to the extremely low pressure changes during the weld cycle.

If welding tip pressures of any magnitude are used extreme dimpling occurs, the honeycomb is crushed before the weld area reaches a molten state.

If follow through of the tip with the work is not rapid enough arcing at the tip occurs and the weld is burned out.

Tip-to-work pressure regulation is as much a factor for consistant welding as heat control. Frictional components of any amount opposing free movement of the tip will increase weld pressures above workable limits.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken on the line 2—2 of FIGURE 1.

FIGURE 3 is a fragmentary elevational view taken on the line 3—3 of FIGURE 2.

FIGURE 4 is an enlarged cross-sectional view showing a typical welding head in operation.

FIGURE 6 is a fragmentary elevational view showing a modification of the apparatus.

Figure 1:
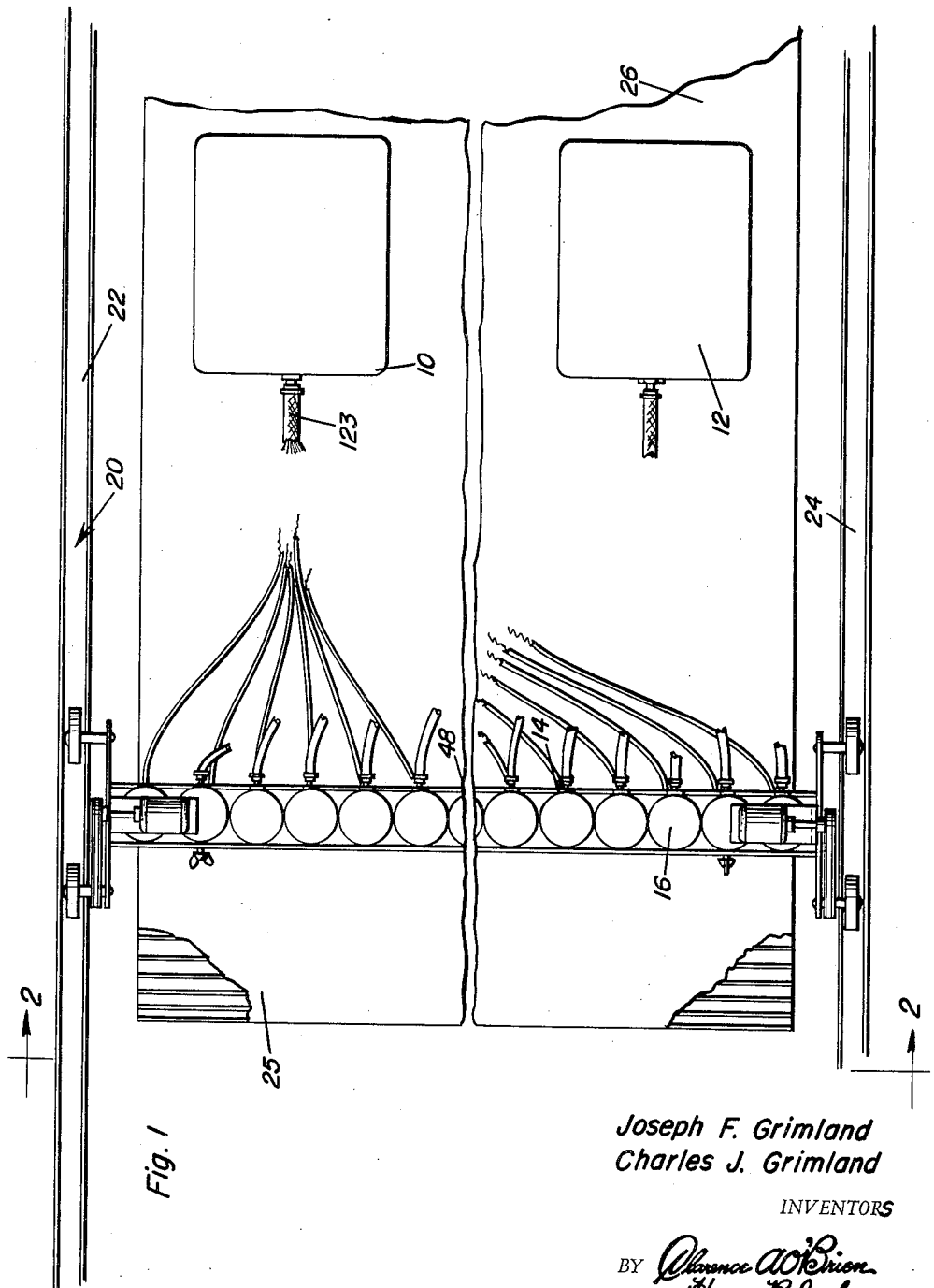
FIGURE 1 is a top plan diagrammatic view showing a bank of welding heads movable over the work to perform welding operations by individual heads.

In the accompanying drawings, which are largely diagrammatic, certain equipment is represented merely to show the principles of operation, it being clearly understood that equipment that is commercially available and conventional in the welding art has been quite extensively used. For instance, unit 10 represents a power supply such as in a stored energy welder of the electrostatic type having electronic control, high frequency operation and variable output depending on the prerogative of the user. Unit 12 is a compressed air supply, this being commercially available equipment. Carriage 14 diagrammatically represents any type of movable support for one or more welding heads 16. The carriage 14 is constrained in its movement by being supported on track 20 having parallel rails 22 and 24. Two things are immediately evident. The diagrammatic illustrations in FIGURES 1-3 show the welding head movable while the work 26 is stationary. This is one of the two options, the other being where the movable heads do not move, that is, they are not translated across the work, and the workpiece 26 is moved with reference to the bank of welding heads 16. Furthermore, the type of carriage is insignificant inasmuch as available equipment such as a large milling machine or available principles of automatic machines may be used in the construction of the carriage or other structural supports for the welding heads and work. To show that the carriage 14 traverses workpiece 26, electric motors 28 and 30 are attached to supports 32 and 34 as illustrated. These electric motors are mounted above the sides 36 and 38 of the carriage and establish a driving connection between the carriage and drive wheels 40 and 42 confined in the rails 22 and 24. Sprocket and chain or belt transmissions 44 and 46 may be used to establish the drive connection between the two motors and the drive wheels.

The lower part of carriage 14 has front and rear support plates 48 and 50 which are each attached to sides 36 and 38 so that the front plates and sides are one rigid structure. However, heads 16 are each individually movable between the sides 36 and 38 and the front and rear plates 48 and 50. A typical head structure is shown in detail in FIGURE 4. It has an outer housing 52 to which adjustment bolt 54 is fixed. The adjustment bolt extends through a vertical slot 58 in plate 50 and is held in an adjusted position within the slot by means of nut 60. Accordingly, each head may be adjusted to account for any contour change in the workpiece. Further, each head is capable of oscillating up and down toward and away from the workpiece within practical limits. One way of achieving this is to have a light spring 64 disposed in housing 52 and bearing against the top of the body 66 of head 16. The spring also bears against the upper wall 68 of housing 52 to obtain its reaction. Further, each head 16 may be made to move laterally of the work so that specific junctures of the honeycomb and sheet may be detected by detectors (not shown) and the heads moved laterally to be positioned over the junctures.

The body 66 of head 16 is a cylinder having an air inlet port 70 registered with slot 72 in the side wall of housing 52. Air line 74 from the unit 12 is attached to port 70 and supplies air under pressure into body 66 by way of passage 76. The piston 80 within cylinder 66 moves only a short distance in the bore 82 of the cylindrical body 66. Piston rod 86 is made hollow and is attached to the lightweight piston head 88. Piston rod guide passage 90 is in registry with cylinder chamber or bore 82 to constrain the reciprocatory movement of the piston rod whose lower end has the forging electrode 92 secured thereto, as by being threaded into the bore of the hollow piston rod 86. Piston head 88 may be made of flexible material so that the reciprocation of the piston is obtained by merely flexing the piston head. A further alternative is to have the piston head made of very light weight metal. In actual construction the total moving weight including the piston, its head and rod, and tip 92 is less than one ounce, making it possible to obtain exceedingly rapid follow up of the crater formation during welding in view of the low inertia.

The lower part 67 of the body 66 is made of a nonconductor. This lower part 67 has a cavity 98 in which electrode 92 is located. Working contacting electrode 100 is also disposed in part within the cavity 98. A light spring 102 has its upper end reacting on body 66 and its lower end seated on a non-conductive washer 104. The washer is mounted on electrode 100, thereby transmitting the compresion of spring 102 to the electrode 100 to assure good contact between the surface of workpiece 26 and electrode 100. Electrode 100 may be made of copper although tip 94 should be made of harder substance, for instance, tungsten. The non-conductive part 67 of the head body 66 is a pressure pad to hold the upper plate or sheet 25 of workpiece 26 flat during welding operation.

FIGURE 4 shows a pair of conductors 120 and 122 attached respectively to electrodes 92 and 100. These conductors are diagrammatically represented since in practice, they are preferably laminated flat, highly flexible conductors. Further diagrammatically represented in this figure is a portion of the power supply 10. The power supply 10 has separate transformers for each head 16 to power the electrodes of the heads individually.

Figure 5:
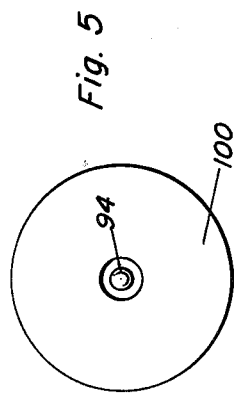
FIGURE 5 is an elevational view taken approximately on the line 5—5 of FIGURE 4 and showing one configuration of electrode structure.

FIGURE 5 shows the configuration of electrodes 92 and 100 when viewed from below. Electrode 100 is circular, while the tip 94 is semi-spherical. Mechanically, the electrodes 92 and 100 are maintained within the head structure, although each of the electrodes are movable. Electrode 92 is movable under the influence of the air pressure, and electrode 100 is opposed in its movement in one direction by the light spring 102. This spring presses the electrode 100 downward until lateral shoulder 101 of the electrode is disposed on land 103 at the edge of opening 105 in the bottom wall of the lower part 67 of body 66. The conductors 120 and 122 do not interfere with this operation, and as shown in FIGURES 1 and 4, these conductors pass through a slot in the lower part of body 66 and connect to the welder after entering a shealth 123.

Typical workpiece 26 is made of an upper plate or sheet 25, a lower plate or sheet 23, and a honeycomb 27. A non-conductive support 17 is disposed beneath sheet 23 and constitutes a structural support for workpiece 26. In FIGURE 4 note the weld 31 which has been formed, and the weld 33 which is being formed. These are beneath the surface of sheet 25 which is opposite to that surface on which electrodes 100 and 92 are operative. Further, attention is directed explicitly to the fact that support 17 is a non-conductor. In forming welds 31 current flows between electrodes 100 and 92, taking a curved path through the sheet 25 and honeycomb 27 beneath the electrodes. The depth at which the welds are formed in the honeycomb is regulated by the power applied to the electrodes. The conditions for welding have been briefly discussed. Summarizing, the heads are capable of moving up and down to follow any contour for workpiece 26, and laterally to seek the junctures between honeycomb 27 and sheet 25. Further, the lower surface 69 of body 66 is a pressure pad to hold sheet 25 flat in the immediate welding vicinity. Electrode 100 is pressed by spring 102 firmly against the outer surface of sheet 25, and electrode 92 with a light force on the top sheet, as pulsed D.C. or A.C. current is applied to the electrodes. The metal of the confronting areas of sheet 25 and honeycomb 27 beneath the electrodes, being in the curved path of current flow, puddles and forging takes place because tip 94 moves fast enough downward into the crater, and is allowed to cool as the head is translated with respect to the workpiece.

Figure 7:
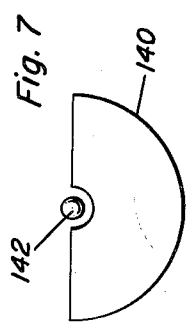
FIGURE 7 is an elevational view taken approximately on the line 7—7 of FIGURE 6 and showing an electrode configuration variation.

FIGURES 6 and 7 show a modification which is identical to the modification in FIGURES 4 and 5 with two exceptions. Electrode 140 is shaped differently. It is made in the form of a semi-circle instead of a full circle and secondly, support 144 for workpiece 146 is made of conductive material. Not only is there a charge in electrodes 140 and 142, but also conductive support 144 carries the charge enabling weld 148 to be made. The weld 148 is between honeycomb 152 and upper sheet 154. In this case current flows from electrode 142 to electrode 140 and from electrode 142 to electrode support 144 allowing further current balance in the weld area. The force from the electrode 142, forges the weld 148 as described.

Figure 8:
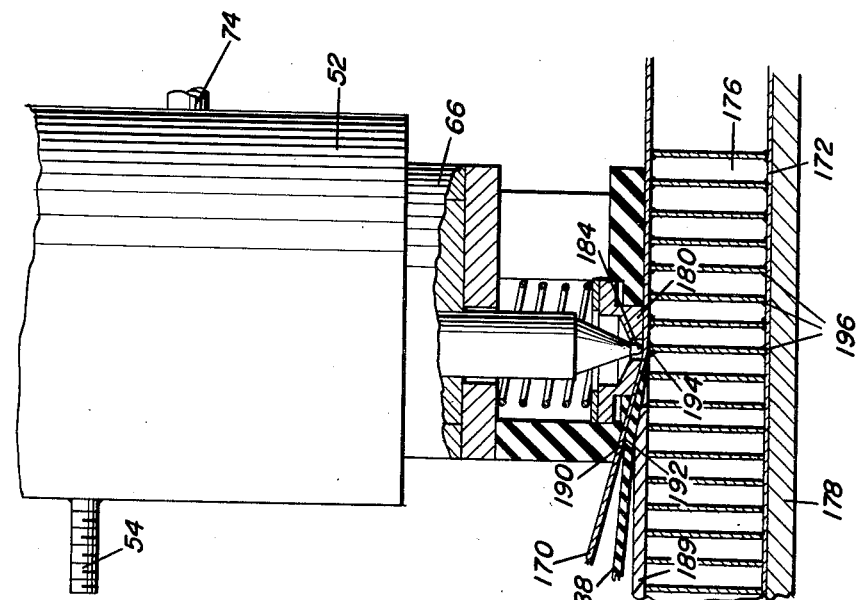
FIGURE 8 is a fragmentary elevational view showing another modification.

FIGURE 8 shows a further modification which differs from FIGURES 4 and 6 in the technique of handling sheets 170 and 172 of honeycomb structure 176. Conductive support 178 is the same as conductive support 144, and both of these are actually conductors. Head 16 having electrodes 180 and 184 essentially the same as the electrodes in FIGURE 4 or in FIGURE 6, are held stationary as a unit, although tip 184 exerts a light force and electrode 180 is capable of moving up and down as opposed by the load of a spring responding to spring 102 of FIGURE 4. Non-conductive guide 188 is located between the honeycomb and sheet 170 and a conductor 189 is in contact with the top of the honeycomb structure and both sheets 170 and 172 are translated. One part of the lower surface 190 of electrode 180 is inclined at the same angle as the non-conductive guide 188 to form a throat 192 through which the upper sheet 170 is fed. The actual welding operation to form weld 194 at the upper faces of the honeycomb is achieved in the same way as described previously.

The embodiment of FIGURE 8 provides for a further welding technique insofar as the handling of the components of honeycomb structure 176 is concerned. The head may be altered to the extent of using only electrode 184 as such. The electrode 180 and lower part of the body are then merely a guide and pressure pad such as would be obtained if electrode 180, for instance, were connected with conductor 122. In such a situation, though, the upper and lower sheets 174 and 170 are used as the other conductor 122 in following the comparative example with FIGURE 4. In other words, following such a procedure, sheets 170 and 172 become, for example, the minus side of the circuit while conductor 184, which is the light electrode, becomes the positive side of the welding head circuit.

Figure 9:
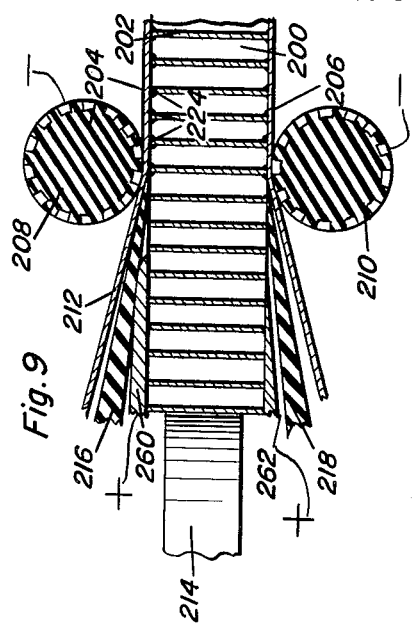
FIGURE 9 is a diagrammatic elevational view showing a further modification.

The purpose of FIGURE 9 is to show that quite drastic structural departures may be made in the handling of typical workpiece 200. Workpiece 200 has honeycomb 202 and a pair of sheets 204 and 206 on opposite faces thereof. This is for exploiting the roll or gimbal head techniques. Head 208 is laminated with alternate conductors and non-conductors, while roller 210 is simply an idler which may be introduced into the electric circuit should it be desirable. Sheets 204 and 206 are passed through throats 212 and 213 while the honeycomb core 202 of workpiece 200 is propelled by any type of conveyor 214 suitable for the purpose. Non-conductive guides 216 and 218 are located between the edges of the honeycomb core 202 and sheets 204, 206, these constituting a single wall of each throat 212 and 213. In this form of the invention conductors 260 and 262 contacting the honeycomb allow current to flow from the conductors 260 and 262 to the heads 208 and 210. Welds 224 are simultaneously formed in the workpiece 200 by essentially the same technique as described previously, the difference being that the rapid movement of one of the pair of electrodes to achieve the forging, is absent.

The foregoing is considered as illustrative only of the principles of the invention. Further, numerous modifications and changes will readily occur to those skilled in the art. For instance the heads 16 are shown on only one side of the work, but these may be located on both sides of the work for simultaneous welding on both faces of the work. It is not desired to limit the invention to the exact construction and operation shown and described, and accordingly all suitable modifications and equivalents may be resorted to, falling within the scope of the invention as claimed.

What is claimed as new is as follows:

1. An electric welding system wherein a first and a second electrode is used to form welds between a contacting edge and inner surface respectively of two parts of a workpiece, said system including the steps of superposing both electrodes in contact with an outer surface portion of one part of the workpiece in alignment with the contacting edge of the other part, applying electric power to the electrodes to form a conductive path between the electrodes with said part of the workpiece in the flow path of current, and thereby forming a puddle between said confronting edge and inner surface of the parts of the workpiece by melting essentially only the surface area in contact with said edge which upon hardening forms the weld.

2. The method of claim 1 including the step of: simultaneously forging said one part of the workpiece as current flows between the electrodes with a pressure approaching zero as the outer surface portion approaches a fluid state for cooling said surface portion and avoiding shrinkage cracks in the part.

3. The method of claim 1 including the step of: rapidly moving one of the electrodes with a pressure approaching zero as the crater is formed in said surface portion while welding to forge the crater including the edges thereof with a light pressure so as to cool the surface portion during welding and avoid subsequent shrinkage cracks.

4. In welding apparatus which has a conventional source of electrical power that is intermittently applied, means especially useful in forming welds between a honeycomb core and at least one sheet located on the edges of the honeycomb core, said means including head structure having a pair of electrodes and a body movably supporting said electrodes, a first of said electrodes having a tip aligned with an edge of the honeycomb core, a second of the electrodes at least partially circumscribing said tip and laterally spaced therefrom, said second electrode having an essentially flat surface in contact with said sheet, means connected with said first electrode for moving said first electrode with a pressure approaching zero into a weld crater as it is being formed while the power is applied thereto, the body of said head having a lower non-conductive surface, a cavity accommodating said electrodes, said non-conductive surface constituting a pressure pad for said sheet, and resilient means reacting on said second electrode and said body for pressing said second electrode against the sheet.

5. The combination of claim 4 wherein said means for reciprocating said first electrode are pneumatically operative and includes a piston rod to which said first electrode is secured, and a cylinder within which a part of said piston rod is disposed and with which there are means connected for application of pneumatic pressure.

6. The combination of claim 4 wherein the honeycomb structure has a second sheet spaced from the first sheet, a mechanical support for said second sheet, said mechanical support constituting an electrical conductor so that upon application of power to said electrodes the second sheet forms a third electrode whereby the sheets and honeycomb core are heated to balance the weld area.

7. In a welding apparatus which has a source of electrical potential for application in readily applied charges, a carriage, a plurality of welding heads carried by said carriage, a workpiece support to hold a workpiece including a sheet and honeycomb core structure adjacent to the carriage and in opposition to said heads, means connecting the heads to said carriage for adjustment of said heads to the contours of the workpiece, each head having a first and a second electrode contacting only the sheet with said first electrode having a tip of smaller area of contact with the workpiece than said second electrode, means connected with said first electrode and in one of said heads for moving said first electrode so that the tip thereof moves into a weld crater being formed while a pulse of power is applied to both of said electrodes, said sheet and a honeycomb core structure being in opposing abutting relation to each other so that said second electrode may maintain continual contact with the sheet and said first electrode may be moved in the crater formed on said sheet as aforesaid, said sheet and honeycomb core structure being located in the path of current travel between the electrodes with the current moving in a curved path through said sheet and portions of the honeycomb core structure in abutting contact with the sheet so that the contact area of the core structure and said sheet provides a juncture for welding.

8. In a welding apparatus which has a source of electrical potential for application in readily applied charges, a carriage, a plurality of welding heads carried by said carriage, a workpiece support to hold a workpiece including a sheet and honeycomb core structure adjacent to the carriage and in opposition to said heads, means connecting the heads to said carriage for adjustment of said heads to the contours of the workpiece, each head having a first and a second electrode contacting only the sheet with said first electrode having a tip of smaller area of contact with the workpiece than said second electrode, means connected with said first electrode and in one of said heads for moving said first electrode so that the tip thereof moves into a weld crater being formed while a pulse of power is applied to both of said electrodes, said sheet and a honeycomb core structure being in opposing abutting relation to each other so that said second electrode may maintain continual contact with the sheet and said first electrode may be moved into the crater formed on said sheet, said sheet and honeycomb core structure being located in the path of current travel between the electrodes with the current moving in an arcuate path through said sheet and portions of the honeycomb core structure in abutting contact with the sheet so that the contact area of the core structure and said sheet provides the point of weld on the surface of the sheet opposite to that occupied by said head, and said welding heads including a lower surface of non-conductive material to form a pressure pad to hold said sheet flat in the immediate vicinity of said electrodes.

9. A method of welding flat sheet material to an abutting edge of a base structure, comprising the steps of: aligning an electrode source of electric current above an upper surface of the flat sheet material in alignment with the abutting edge disposed in contact with a lower surface of the sheet material; supplying a pulse of current to said electrode source for directed flow through the sheet material and a portion of the base structure adjacent said abutting edge to form weld fillets between said abutting edge on opposite sides thereof and said lower surface of the sheet material; and moving the source of current into contact with the upper surface of the sheet material with a decreasing pressure approaching zero to forge the upper surface as it is rendered fluid by the current passing therethrough.

10. In welding apparatus having a source of electrical power, means for forming welds between edges of a base structure and at least one flat sheet of material located on said edges, said means including movably supported electrode means having a forging electrode aligned with an edge of the base structure and a work contacting electrode non-conductively spaced from the forging electrode and yieldably biased into surface contact with said sheet of material and means operatively connected to said forging electrode for movement thereof into a weld crater formed therebelow in the sheet material, with a pressure approaching zero.

References Cited in the file of this patent

UNITED STATES PATENTS

| | | |
|---|---|---|
| 1,296,780 | Dyer | Mar. 11, 1919 |
| 1,465,241 | Townsend | Aug. 14, 1923 |
| 2,033,851 | Roth | Mar. 10, 1936 |
| 2,045,523 | Fassler | June 23, 1936 |
| 2,272,968 | Dyer | Feb. 10, 1942 |
| 2,300,700 | Porter | Nov. 3, 1942 |
| 2,810,062 | Kavnitz | Oct. 15, 1957 |